(12) United States Patent
Pasquero et al.

(10) Patent No.: US 8,947,380 B2
(45) Date of Patent: Feb. 3, 2015

(54) ELECTRONIC DEVICE INCLUDING TOUCH-SENSITIVE DISPLAY AND METHOD OF FACILITATING INPUT AT THE ELECTRONIC DEVICE

(75) Inventors: Jerome Pasquero, Kitchener (CA); David Ryan Walker, Waterloo (CA); Scott Duncan Inglis, Surrey (CA)

(73) Assignee: Blackberry Limited, Waterloo (CA)

( * ) Notice: Subject to any disclaimer, the term of this patent is extended or adjusted under 35 U.S.C. 154(b) by 322 days.

(21) Appl. No.: 13/363,291

(22) Filed: Jan. 31, 2012

(65) Prior Publication Data

US 2013/0194187 A1 Aug. 1, 2013

(51) Int. Cl.
G06F 3/041 (2006.01)

(52) U.S. Cl.
USPC .......................................... 345/173; 345/168

(58) Field of Classification Search
CPC ... G06F 3/0236; G06F 3/0488; G06F 3/0489; G06F 3/04883; G06F 3/04886
USPC ......................................................... 345/168
See application file for complete search history.

(56) References Cited

U.S. PATENT DOCUMENTS

| 2008/0168366 | A1 | 7/2008 | Kocienda et al. | |
| 2008/0316183 | A1 | 12/2008 | Westerman et al. | |
| 2010/0177048 | A1* | 7/2010 | Semenets et al. | 345/173 |
| 2010/0289749 | A1* | 11/2010 | Ahn | 345/172 |
| 2011/0093497 | A1 | 4/2011 | Poon | |
| 2011/0205160 | A1* | 8/2011 | Song et al. | 345/168 |

FOREIGN PATENT DOCUMENTS

| EP | 0660218 A1 | 6/1995 |
| WO | 2010105440 A1 | 9/2010 |
| WO | 2011073992 A3 | 6/2011 |
| WO | WO 2011073992 A2 * | 6/2011 |

OTHER PUBLICATIONS

Extended European Search Report dated Jul. 12, 2012, issued against corresponding EP Application No. 12153266.7.
http://www.androidtapp.com/tag/virtual-keyboard, published on Oct. 19, 2011.
http:// www.yorku.ca/mack/hci3.html, "Text Entry for Mobile Computing: Models and Methods, Theory and Practice, I.S. MacKenzie et al.", Human-Computer Interaction, 17, 147-198, published (2002).
Examiner's Report dated May 2, 2014, issued from the corresponding Canadian patent application No. 2,804,811.

* cited by examiner

*Primary Examiner* — Lixi C Simpson
(74) *Attorney, Agent, or Firm* — Lesley M. Morrison; Borden Ladner Gervais LLP

(57) ABSTRACT

A method includes displaying keys of a keyboard in a keyboard area on a touch-sensitive display, at least one of the keys being associated with multiple letter characters, the keyboard area located adjacent to a first side of the touch-sensitive display, detecting a touch in a keyboard area of the touch-sensitive display, the touch being associated with a character input, detecting a gesture in a gesture input area of a touch-sensitive display, the gesture area located adjacent to a second side of the touch-sensitive display, the second side opposite to the first side; wherein the gesture is associated with a keyboard-related function at the processor and the keyboard-related function is operable on the character input or a next character input.

4 Claims, 11 Drawing Sheets

ELECTRONIC DEVICE INCLUDING TOUCH-SENSITIVE DISPLAY AND METHOD OF FACILITATING INPUT AT THE ELECTRONIC DEVICE

FIELD OF TECHNOLOGY

The present disclosure relates to electronic devices including touch-sensitive displays and the control of such electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

BRIEF DESCRIPTION OF THE DRAWINGS

Embodiments of the present disclosure will now be described, by way of example only, with reference to the attached figures, wherein.

DETAILED DESCRIPTION

Figure 1:
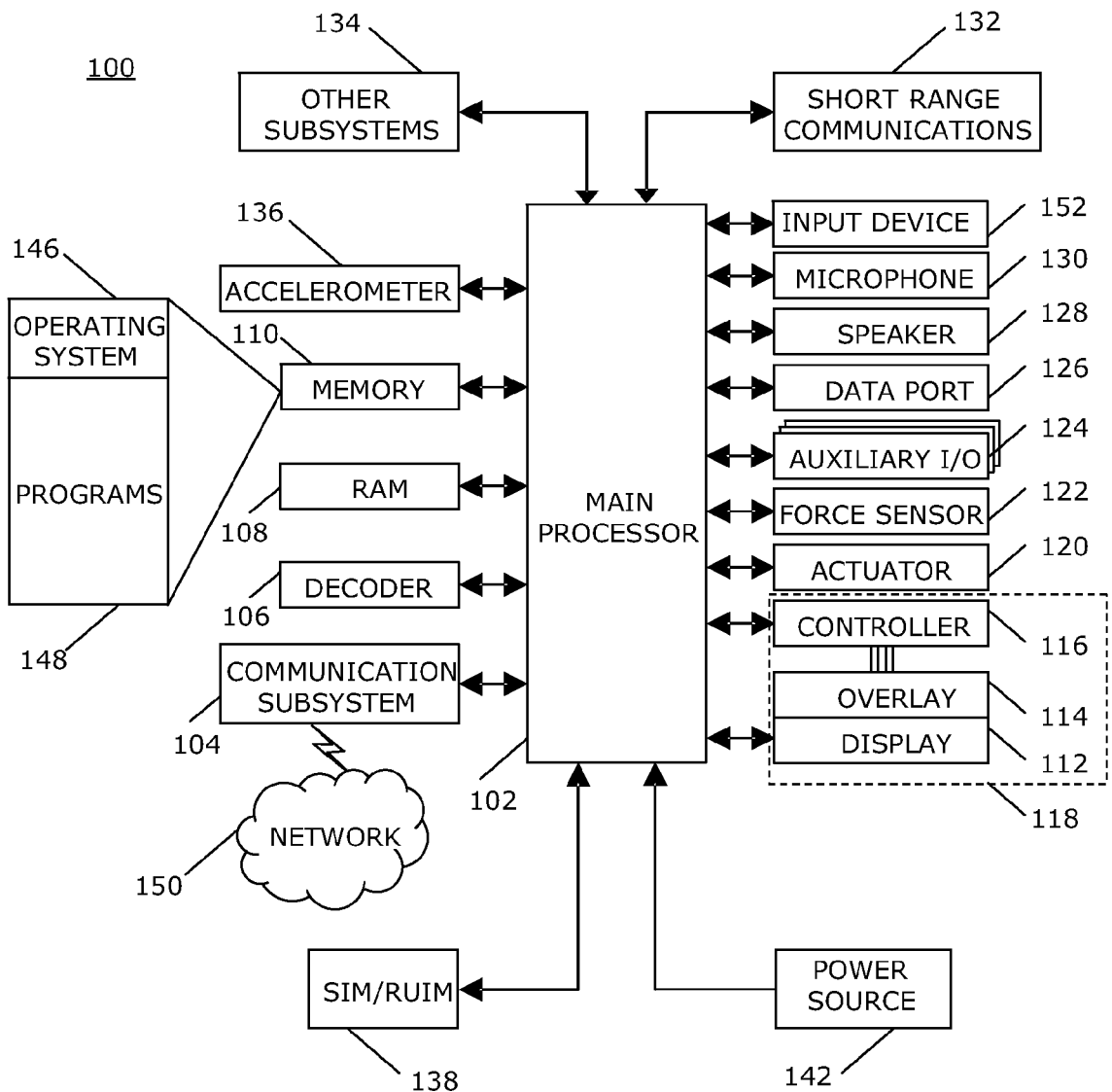
FIG. 1 is a simplified block diagram of one example of a portable electronic device in accordance with the present disclosure.

In an aspect of the present disclosure there is provided, a method including: displaying keys of a keyboard in a keyboard area on a touch-sensitive display, at least one of the keys being associated with multiple letter characters, the keyboard area located adjacent to a first side of the touch-sensitive display; detecting a touch in a keyboard area of the touch-sensitive display, the touch being associated with a character input; detecting a gesture in a gesture input area of a touch-sensitive display, the gesture area located adjacent to a second side of the touch-sensitive display, the second side opposite to the first side; wherein the gesture is associated with a keyboard-related function at the processor and the keyboard-related function is operable on the character input or a next character input.

In another aspect of the present disclosure there is provided, a method including: detecting a touch at a key in a keyboard area on a touch-sensitive display, the key being associated with multiple characters, and adding ones of the multiple characters to character strings; determining candidate character strings by identifying objects in reference data that have initial portions that match the character strings; displaying one of the candidate character strings on the touch-sensitive display; receiving a gesture input in a gesture input area on the touch-sensitive display, a keyboard-related function associated with the gesture input being determined at the processor; in response to the gesture input, entering the one of the candidate character strings in a display area of the touch-sensitive display; wherein the keyboard area is located adjacent a first side of the touch-sensitive display and the gesture input area is located adjacent a second side of the touch-sensitive display, the first side being opposite to the second side.

In yet another aspect of the present disclosure there is provided, an electronic device including: a touch-sensitive display for detecting touches in a keyboard area and detecting gesture input in a gesture input area; the keyboard area located adjacent a first side of the touch-sensitive display and the gesture input area located adjacent a second side of the touch-sensitive display, the first side being opposite to the second side; and a processor for displaying keys of a keyboard in a keyboard area on a touch-sensitive display, at least one of the keys being associated with multiple letter characters, receiving a character input associated with the keyboard area, determining a keyboard-related function associated with the gesture input, the keyboard-related function being operable on the character input or a next character input.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, tablet computers and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators 120 to provide tactile feedback and one or more force sensors 122 to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin point and the finishing point of the swipe may be utilized to determine the magnitude or distance of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Figure 2:
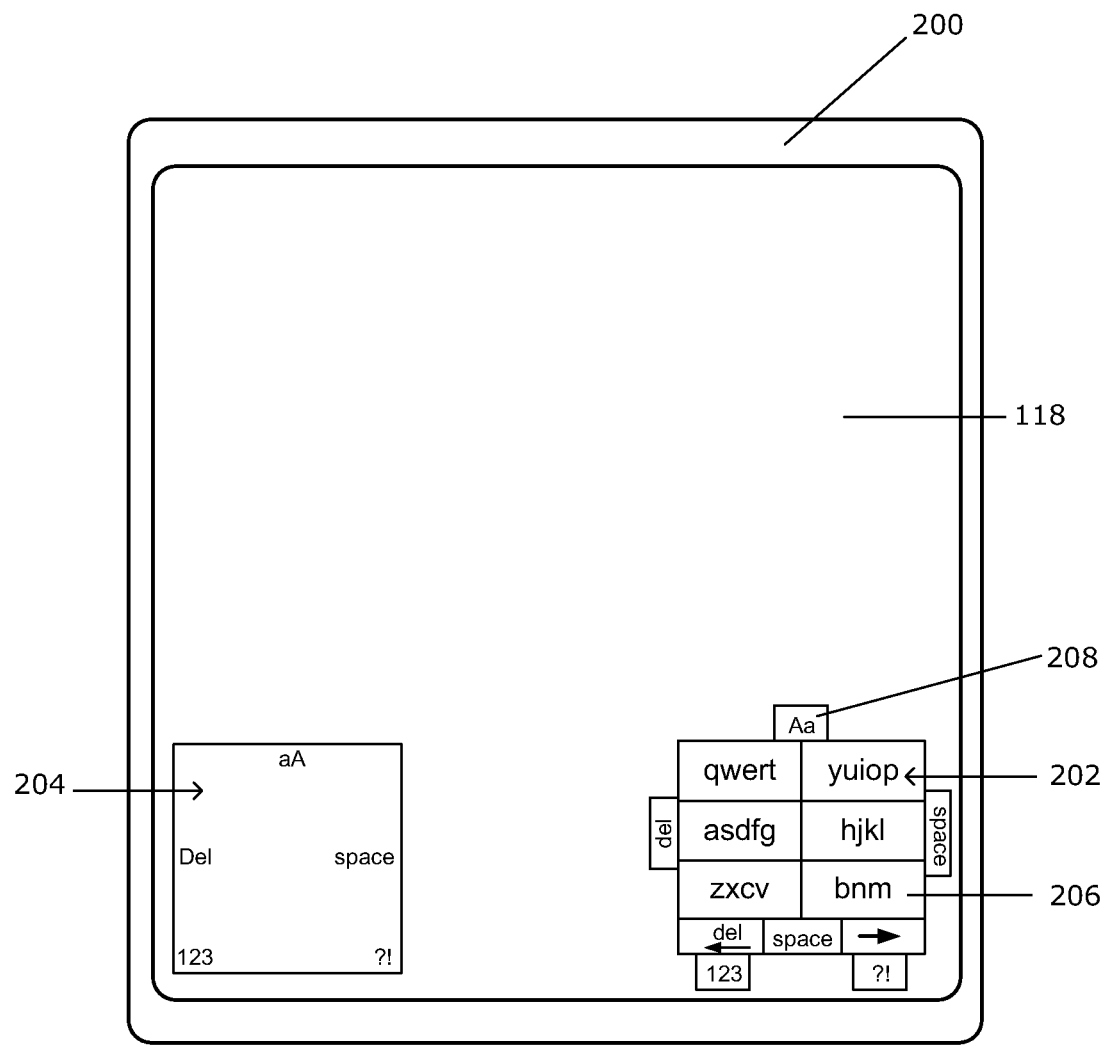
FIG. 2 is a front view of an example portable electronic device.

A front view of an example of a portable electronic device 100 is shown in FIG. 2. The portable electronic device 100 includes a housing 200 that houses the internal components that are shown in FIG. 1 and frames the touch-sensitive display 118 such that an outer surface of the touch-sensitive display 118 is exposed for user-interaction when the portable electronic device 100 is in use. In the example orientation shown in FIG. 2, the touch-sensitive display 118 includes a keyboard area 202 including a virtual keyboard and a gesture input area 204 for user input of data. As shown, the virtual keyboard is a reduced keyboard in which keys 206 of the virtual keyboard include multiple letter characters. The keyboard area 202 further includes function keys 208 associated with keyboard-related functions including: capitalize, numeric keypad, delete, space and symbol keypad. The gesture input area 204 is able to receive gestures associated with the keyboard-related functions. The gestures cooperate with touches in the keyboard area 202 and to increase the efficiency of character input.

Figure 3:
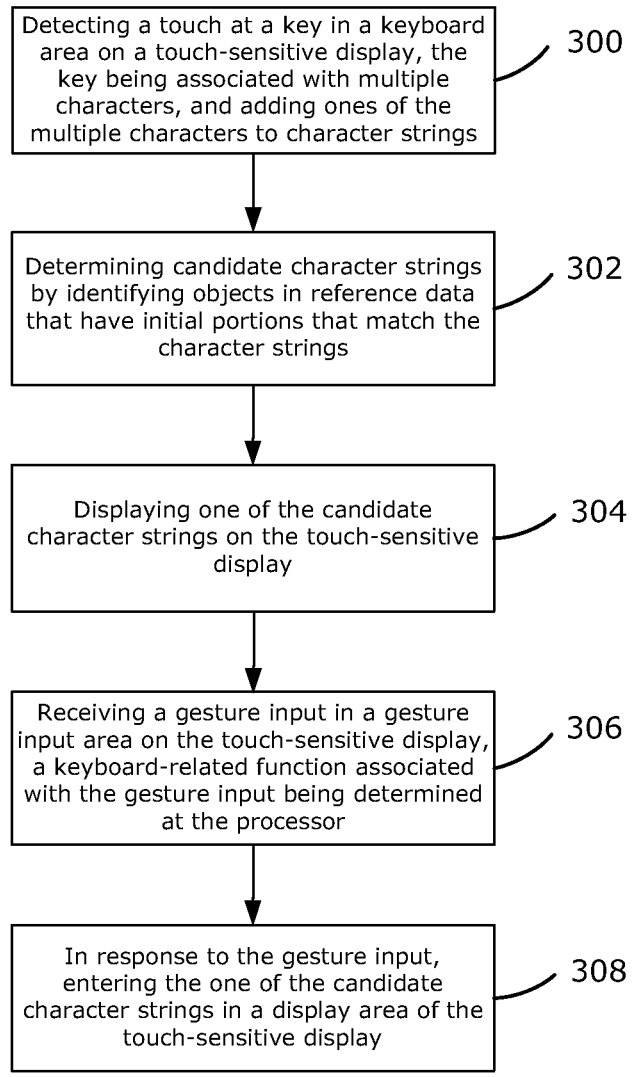
FIG. 3 is a flowchart illustrating an example of a method of facilitating input an electronic device in accordance with the present disclosure.

FIG. 3 is a flowchart illustrating an example of a method of facilitating input at an electronic device. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

The processor 102 detects 300 a touch at a key in a keyboard area on a touch-sensitive display 118, the key being associated with multiple characters, and adds ones of the multiple characters to character strings. The number of character strings is determined based on how many characters are associated with the key. In the example portable electronic device of FIG. 2, three or four letter characters are associated with the keys. Candidate character strings are determined 302 by identifying objects in reference data that have initial portions that match the character strings. The reference data is searchable to identify linguistic objects that match an entered character string. Linguistic objects include words, acronyms, and contact data records stored in a contacts database, for example. The reference data may be provided as part of a predictive text application that includes a frequency ranking such that words that are entered more often by the user are ranked higher. The predictive text application may be used to generate a ranking of candidate character strings. Further, the predictive text application may modify the reference data to add words when a linguistic object, such as a word or set of characters, that is not already included, is entered by the user.

One of the candidate character strings is then displayed 304 on the touch-sensitive display 118. A gesture input is received 306 in a gesture input area 204 on the touch-sensitive display 118, and a keyboard-related function associated with the gesture input is determined at the processor 102. In response to the gesture input, the one of the candidate character strings is entered 308 in a display area of the touch-sensitive display 118. The display area may be associated with an application being executed by the portable electronic device 100. For example, the display area may be part of an electronic message, a word processing document or a web page address bar, for example.

In order to perform the method, the keyboard area 202 is located adjacent a first side of the touch-sensitive display 118 and the gesture input area 204 is located adjacent a second side of the touch-sensitive display 118. The first side is opposite to the second side and in FIG. 2, the first side is the left side of the touch-sensitive display 118 and the second side is the right side of the touch-sensitive display 118. A user may input characters using their right thumb while their left thumb performs gestures in the gesture input area 204. This arrangement facilitates the efficient input of characters by allowing a user to maintain his or her gaze on the keyboard area 202. Because the gestures are easy to learn, the gestures may be performed without looking at the gesture input area 204.

Figure 4A:
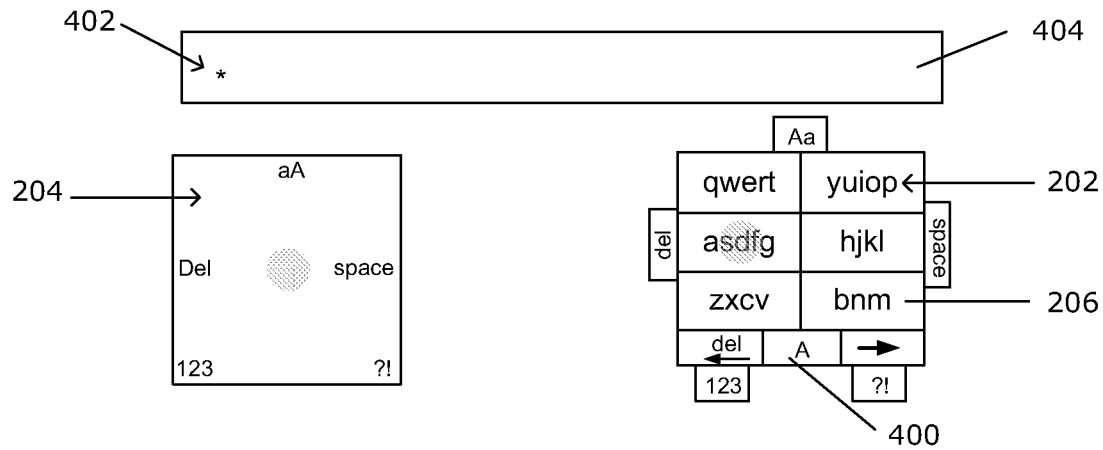
FIGS. 4A to 7C illustrate examples of a portable electronic device receiving touch and/or gesture input in accordance with the present disclosure.
Figure 4B:
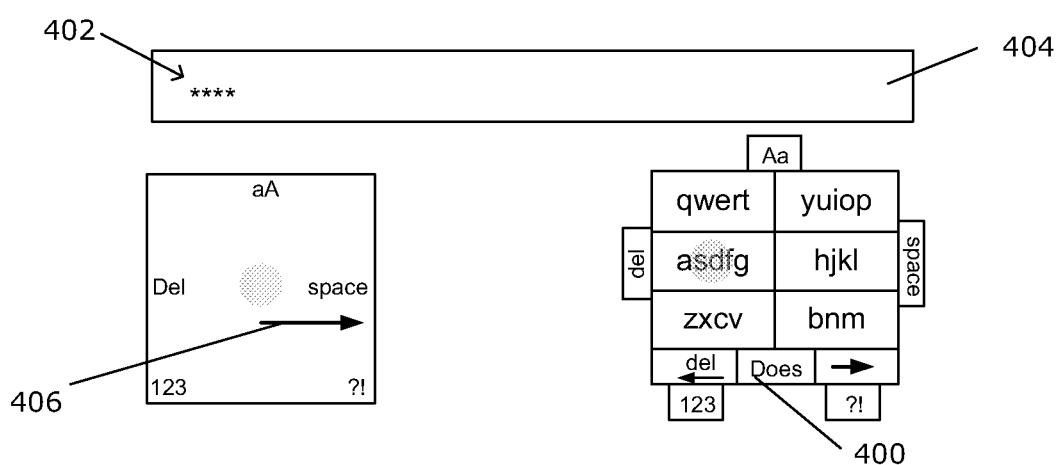
Figure 4C:
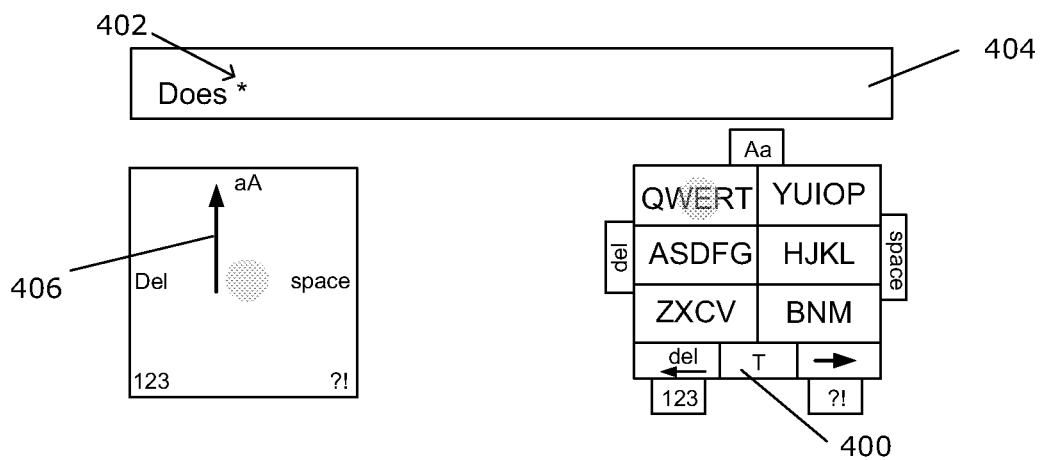

Continued reference is made to FIG. 3, with additional reference to FIGS. 4A to 4C to describe one example of a method of facilitating input at the portable electronic device 100. In the present example, the processor 102 detects 300 a touch at the key 206 in the keyboard area 202. As shown in FIG. 4A, the key 206 is associated with the characters "a", "s", "d", "f" and "g", which are added to character strings. Candidate character strings are determined 302 by identifying objects in reference data that have initial portions that match the character strings. The candidate character string, "A" is then displayed 304 on a key 400 in the keyboard area 202 on the touch-sensitive display 118 and a place-holding character 402, which is "*" in this example, is displayed in a display area 404. In this example, "A" is the most probable candidate character string and is determined based on frequency of user entry. Three further touches are detected 300 at keys 206 and the characters associated with the selected keys are added to character strings. Candidate character strings are determined 302 and a most probable character string based on frequency of user entry is determined. The candidate character string, "Does" is then displayed 304 on the key 400 in the keyboard area 202 on the touch-sensitive display 118 and place-holding characters 402 are displayed in the display area 404, as shown in FIG. 4B. A swipe gesture input, which is indicated by arrow 406 in FIG. 4B, is received 306 in the gesture input area 204 on the touch-sensitive display 118, and a keyboard-related function associated with the gesture input is determined at the processor 102. The keyboard-related function is an "accept displayed candidate character string" function. In response to the swipe 406, "Does" is entered 308 in the display area 404 of the touch-sensitive display 118, as shown in FIG. 4C.

As described, a swipe that starts near the centre of the gesture input area 204 and is directed toward a right side of the gesture input area is associated with an "accept displayed candidate character string" keyboard-related function. The same arrangement of keyboard area 202 and gesture input area 204 may be used to facilitate input using different gestures. A swipe that starts near the centre of the gesture input area 204 and is directed toward a top of the gesture input area is associated with a "capitalize" keyboard-related function. A swipe that starts near the centre of the gesture input area 204 and is directed toward a left side of the gesture input area is associated with a "delete" keyboard-related function. A swipe that starts near the centre of the gesture input area 204 and is directed toward a bottom left of the gesture input area is associated with a "numeric keypad" keyboard-related function. A swipe that starts near the centre of the gesture input area 204 and is directed toward a bottom right of the gesture input area is associated with a symbol keypad keyboard-related function. The same type of swipe as the swipe associated with the "accept displayed candidate character string" may also be associated with a "space" keyboard-related function when a space option is available.

Referring to FIGS. 4C to 7C, a swipe gesture input, which is indicated by arrow 408 in FIG. 4C, is received in the gesture input area 204 on the touch-sensitive display 118, and a keyboard-related function associated with the gesture input is determined at the processor 102. As shown in FIG. 4C, the keyboard-related function is a "capitalize" function. Touch input is detected at key 206, which is associated with the characters "q", "w", "e", "r" and "t", which are added to character strings. The candidate character string, "T" is then displayed on the key 400 in the keyboard area 202 on the touch-sensitive display 118 and the place-holding character 402 is displayed in a display area 404. Six further touches are detected at the keys 206 and the characters associated with the selected keys are added to character strings. Candidate character strings are determined 302 and a most probable character string based on frequency of user entry is determined. The candidate character string, "Tuesday" is then displayed on the key 400 in the keyboard area 202 on the touch-sensitive display 118 and place-holding characters 402 are displayed in the display area 404, as shown in FIG. 5A. A swipe gesture input, which is indicated by arrow 500 in FIG. 5A, is then received in the gesture input area 204 on the touch-sensitive display 118, and an "accept most probable candidate character string" function associated with the gesture input is determined at the processor 102. In response to the swipe 500, "Tuesday" is entered in the display area 404 of the touch-sensitive display 118, as shown in FIG. 5B. FIG. 5B also shows the word "the", which is entered following similar steps described for the words "Does" and "Tuesday".

Figure 5A:
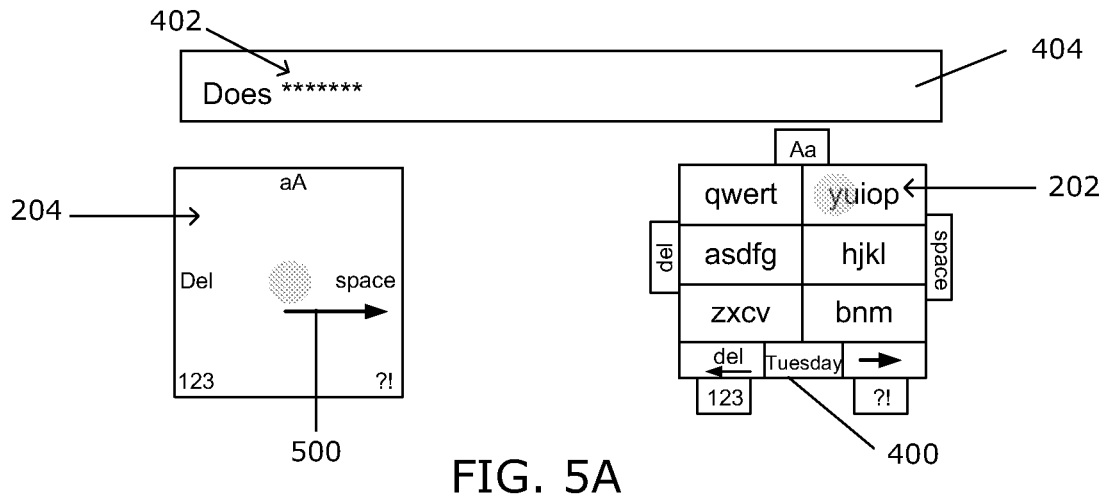
Figure 5B:
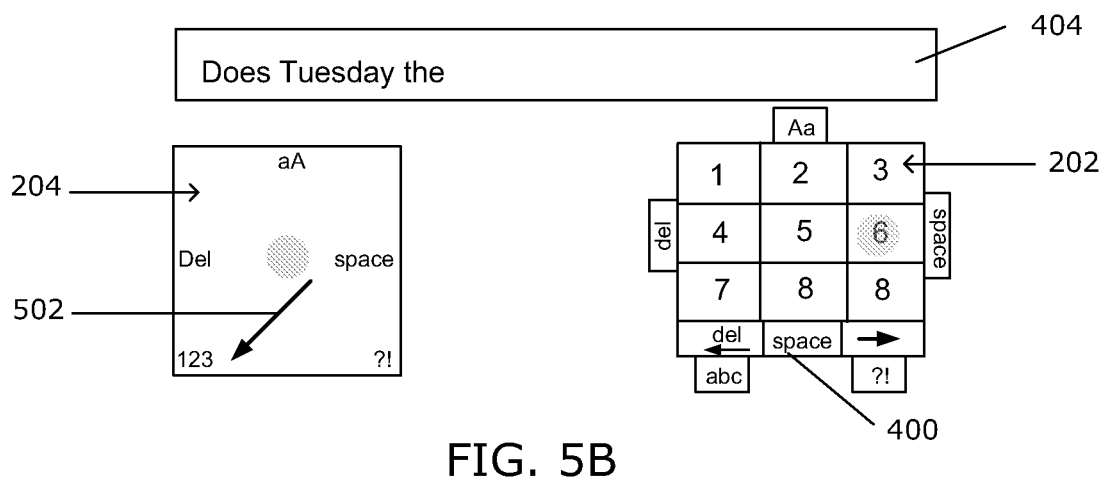
Figure 5C:
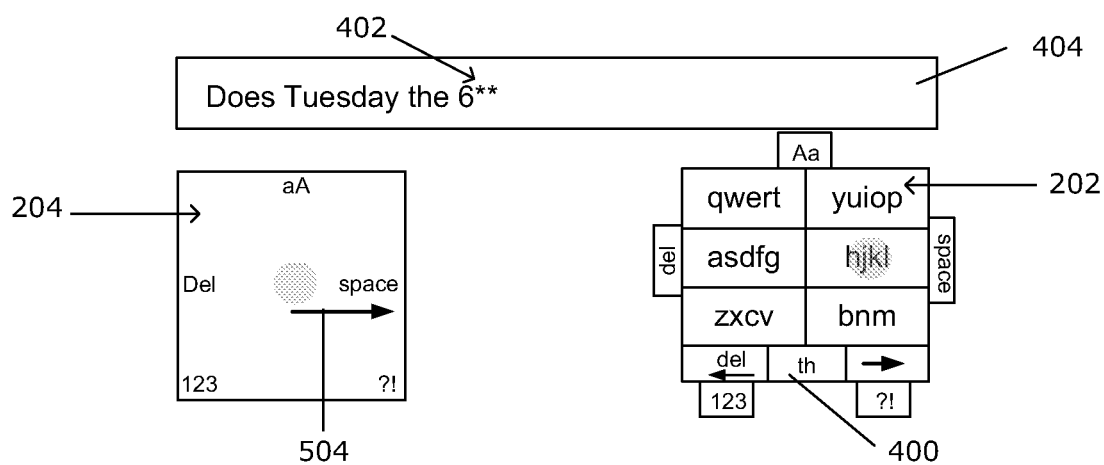
Figure 6A:
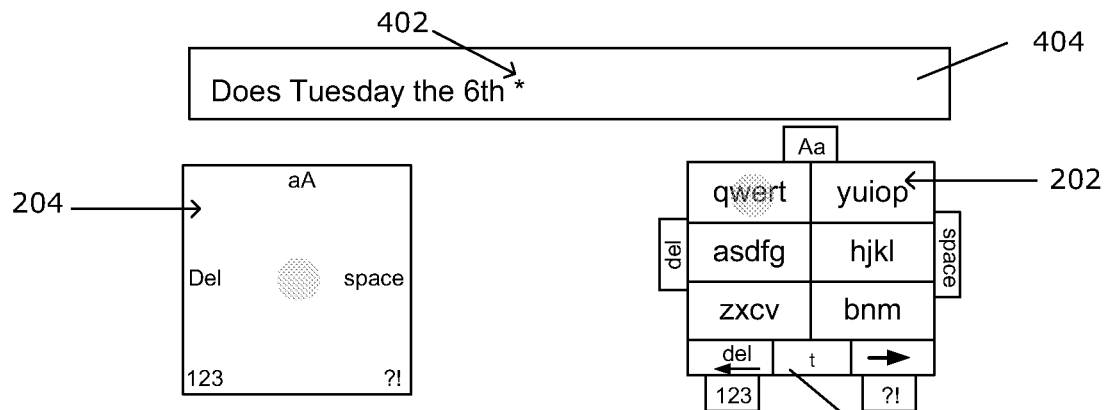

A swipe gesture input, which is indicated by arrow 502 in FIG. 5B, is then received in the gesture input area 204 on the touch-sensitive display 118, and a keyboard-related function associated with the gesture input is determined at the processor 102. As shown in FIG. 5B, the keyboard-related function is the "numeric keypad" function. Touch input associated with the number six is then detected. When the keyboard has returned to a character keyboard, two further touches are detected and the candidate character string, "th" is displayed on the key 400 in the keyboard area 202 on the touch-sensitive display 118 and place-holding characters 402 are displayed in the display area 404, as shown in FIG. 5C. A swipe gesture input, which is indicated by arrow 504 in FIG. 5C, is then received corresponding to the "accept" displayed candidate character string function and, in response, "th" is entered in the display area 404 of the touch-sensitive display 118, as shown in FIG. 6A.

Figure 6B:
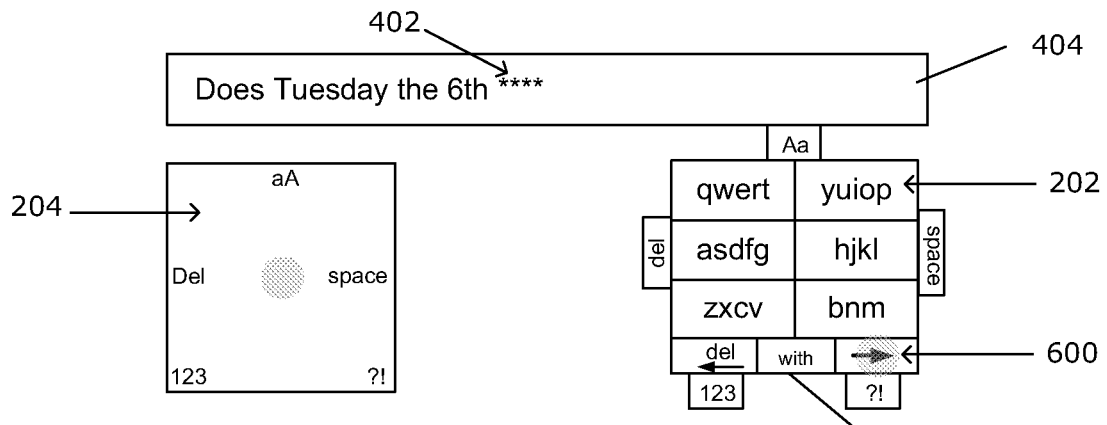
Figure 6C:
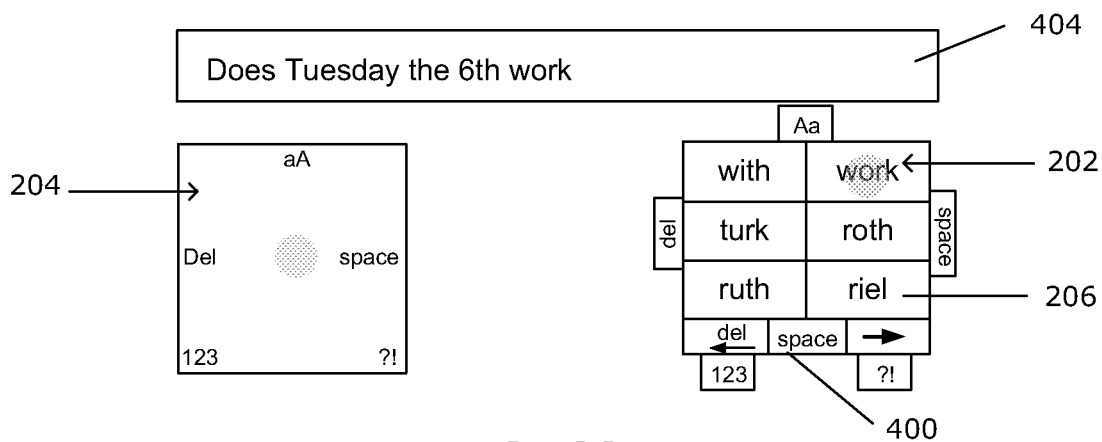

When the displayed candidate character string is not the character string that the user wishes to enter, the user may view additional candidate character string options. As shown in FIG. 6B, four touches are detected and the candidate character string "with" is displayed on the key 400 in the keyboard area 202 on the touch-sensitive display 118 and place-holding characters 402 are displayed in the display area 404, as shown in FIG. 6B. A touch is then received on an arrow key 600 in the keyboard area 202. Referring to FIG. 6C, other candidate character strings are displayed on the keys 206 in response to the touch on the arrow key 600. In response to a touch on the key 206 displaying "work", "work" is entered in the display area 404 of the touch-sensitive display 118, as shown in FIG. 6C.

Figure 7A:
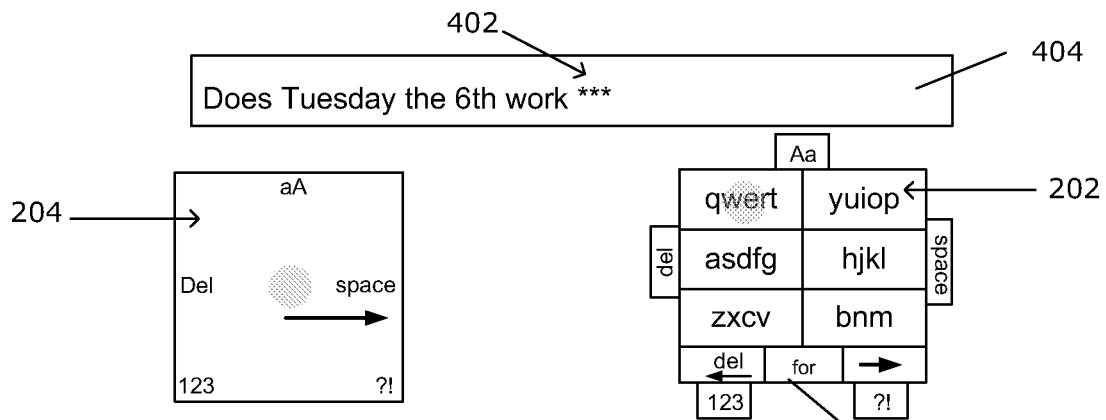
Figure 7B:
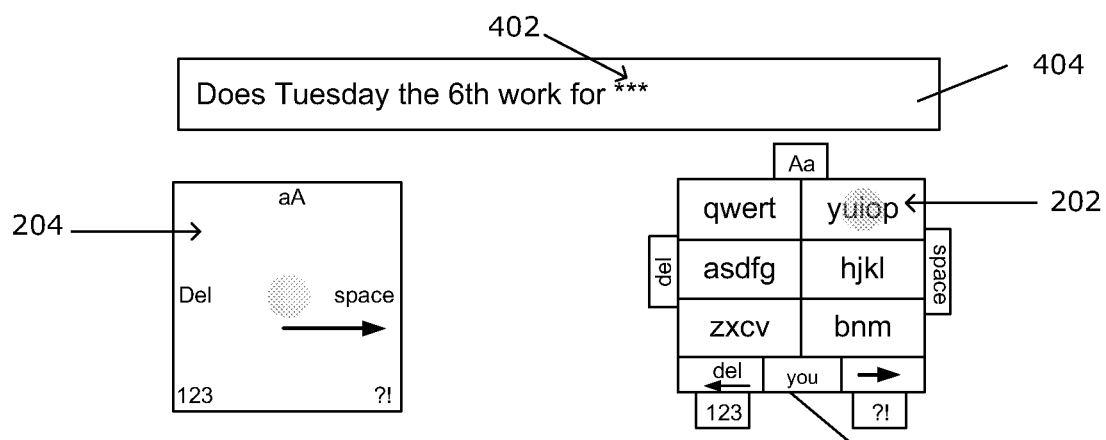
Figure 7C:
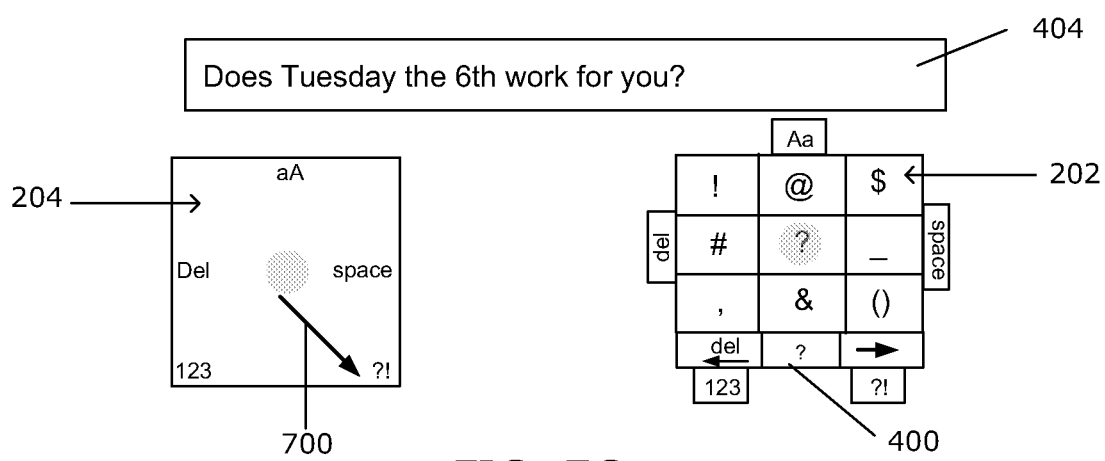

Referring to FIGS. 7A and 7B, the words "for" and "you" are entered in a similar manner as has been described. Referring to FIG. 7C, a swipe gesture input, which is indicated by arrow 700, is received in the gesture input area 204 on the touch-sensitive display 118, and the symbol keypad keyboard-related function is determined at the processor 102. In response to the swipe 700, the keys 206 display symbols. A touch is then received on a "?" key and when swipe gesture input (not shown) is received to accept the displayed candidate character string, the "?" is entered in the display area 404.

Although the most probable character string in this example is determined based on frequency of user input. The most probable character string may alternatively be determined based on overall frequency of use within a particular language or other known predictive text methods. Alternatively, the displayed candidate character string may be ranked above the other candidate character strings based on an alphabetical ranking. In one example, a predictive text method based on N-grams is used. This predictive text method suggests likely next words based on previously entered words. Predictive text methods may be used on their own or in combination with other predictive text methods.

Figure 8:
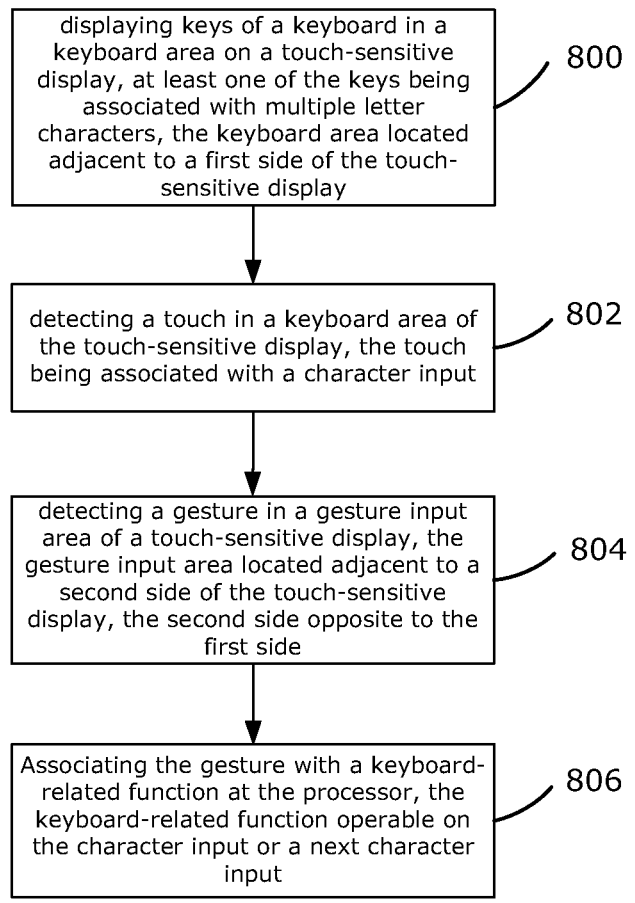
FIG. 8 is a flowchart illustrating another example of a method of facilitating input an electronic device in accordance with the present disclosure.

Another example method of facilitating input at an electronic device is shown in FIG. 8. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

Keys of a keyboard are displayed 800 in a keyboard area 202 on a touch-sensitive display 118, at least one of the keys being associated with multiple letter characters, the keyboard area 202 located adjacent to a first side of the touch-sensitive display 118. The processor 102 detects 802 a touch in a keyboard area 202 of the touch-sensitive display 118, the touch being associated with a character input. The processor 102 detects 804 a gesture in a gesture input area 204 of the touch-sensitive display, the gesture input area 204 located adjacent to a second side of the touch-sensitive display 118, the second side opposite to the first side. The gesture is associated 806 with a keyboard-related function at the processor 102 and the keyboard-related function is operable on the character input or a next character input.

The gesture input area has been described as providing the accept displayed candidate character string function, the space function, the capitalize function, the delete function, the numeric keypad function and the symbol keypad function, however, it is possible that more or fewer functions may be performed in response to gesture input.

Figure 9:
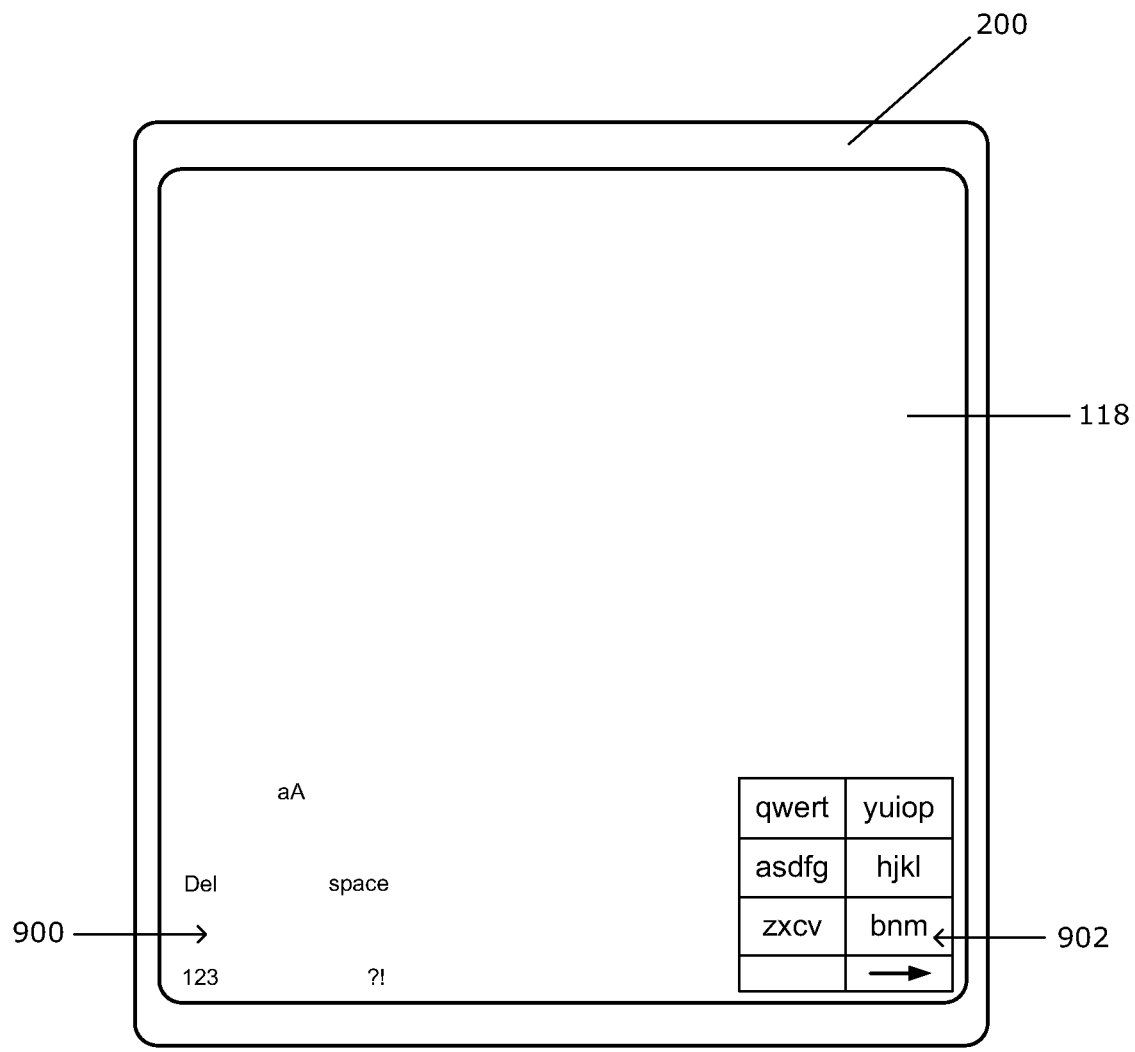
FIG. 9 is a front view of an example portable electronic device according to another embodiment.

Referring to FIG. 9, another example of a portable electronic device for performing the described method is shown. In this example, there is no duplication of functionality between a gesture input area 900 and a keyboard area 902. In addition, the gesture input area is transparent or semi-transparent so that information displayed at the gesture input area is not hidden by the gesture input area. In addition, the identifiers (Aa, Del, space, 123 and ?!) may not be displayed once the user has learned the associated gestures to further increase the amount of information on the touch-sensitive display 118 that is viewable by the user.

Figure 10:
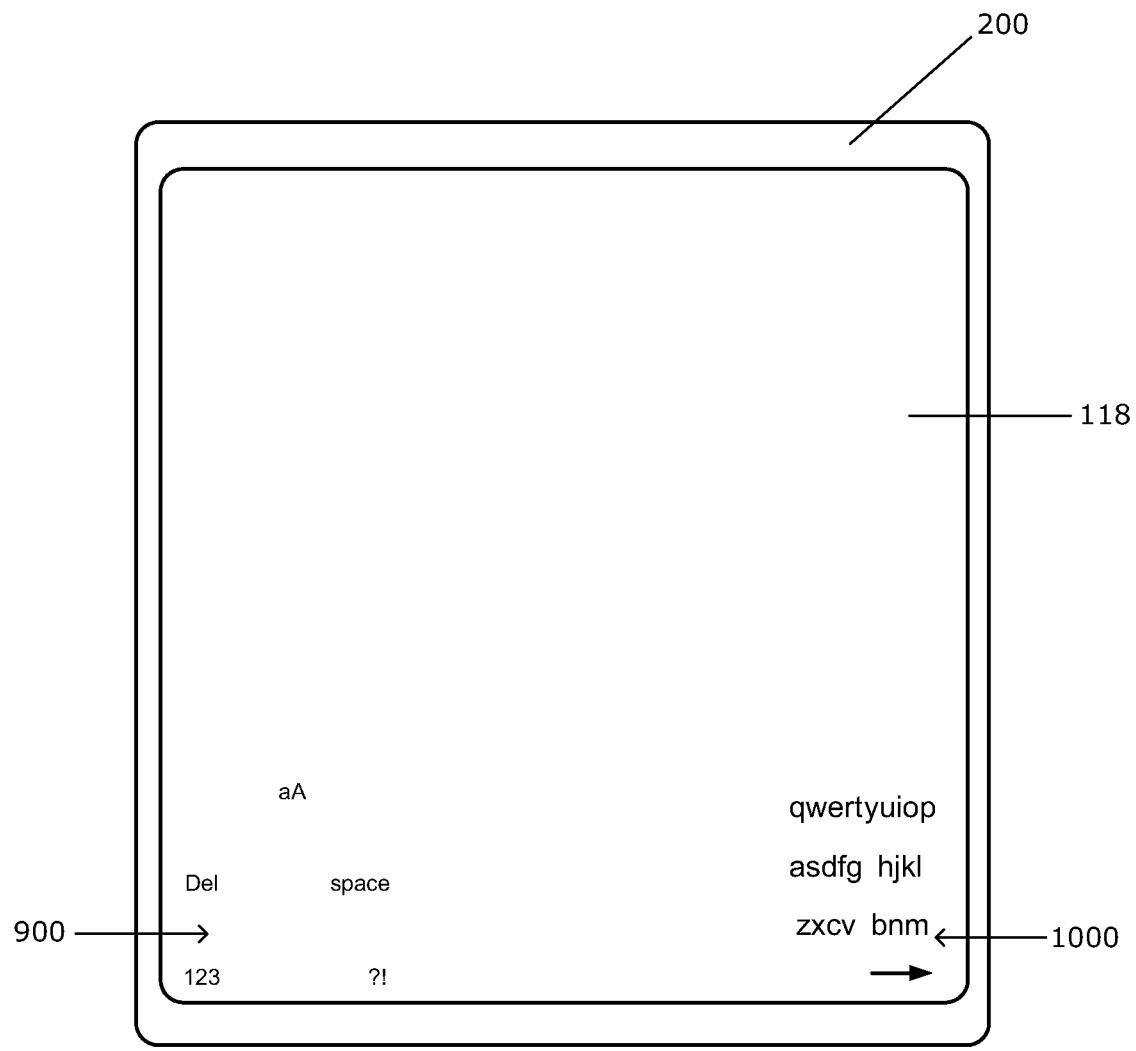
FIG. 10 is a front view of an example portable electronic device according to yet another embodiment.

Referring to FIG. 10, still another example of a portable electronic device for performing the described method is shown. In this example, the keys 206 are transparent or semi-transparent so that keyboard area 1000 does not entirely obscure information displayed at the keyboard area location on the touch-sensitive display 118. As shown, the keyboard area 1000 occupies a small amount of space on the touch-sensitive display 118, however, provides full functionality when used in combination with the gesture input area.

Figure 11:
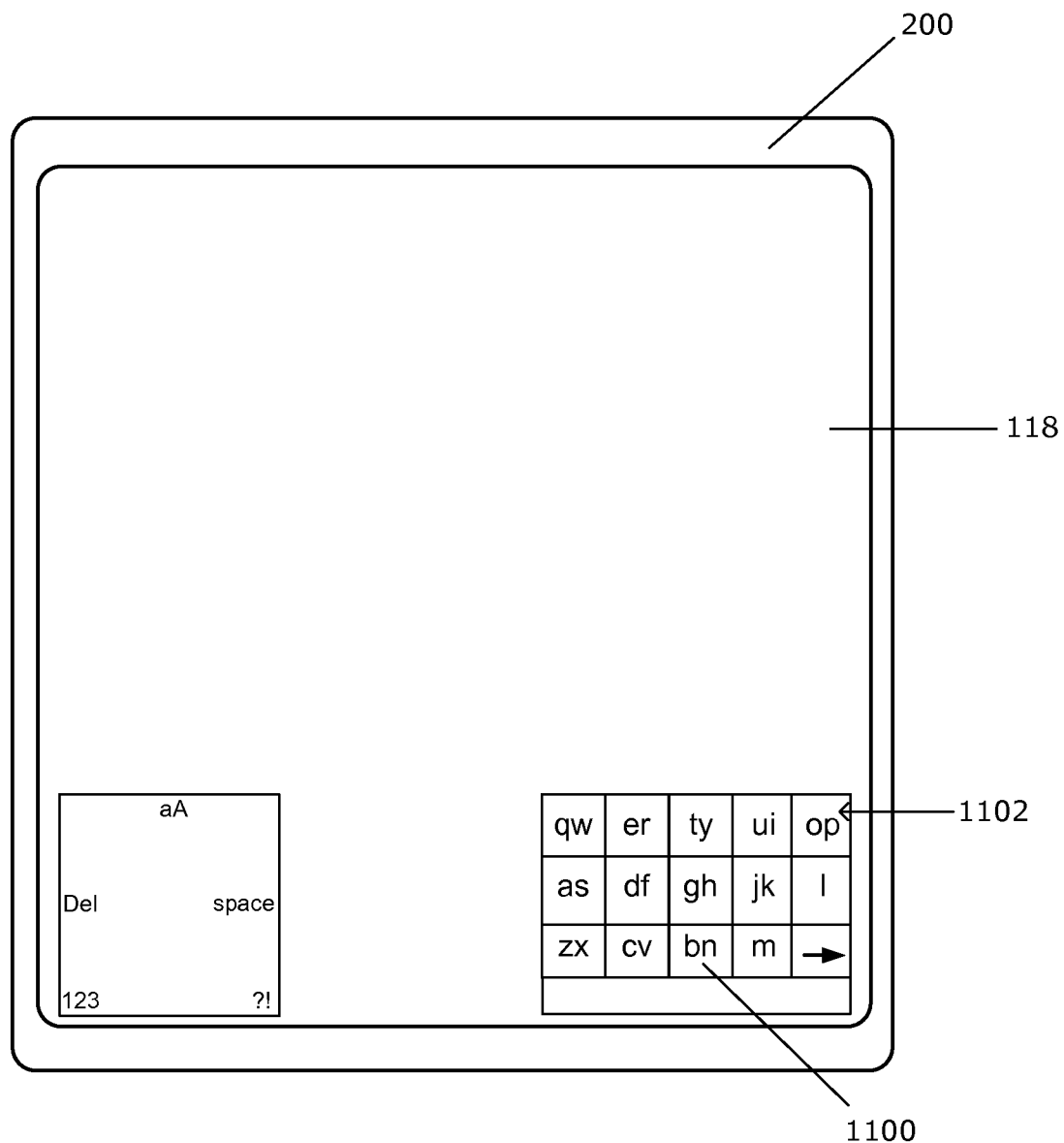
FIG. 11 is a front view of an example portable electronic device according to still another embodiment.

Referring to FIG. 11, still another example of a portable electronic device for performing the described method is shown. In this example, keys 1100 in the keyboard area 1102 are associated with one or two characters. Other keyboard configurations are possible.

In another example, the arrow key 600 may be removed and a list of other candidate character strings may be accessed by a circle gesture in the gesture input area, for example.

By providing a method of facilitating input in which character input is performed at a first side, by a first hand, and gestures are performed at a second side, by a second hand, user fatigue while typing may be reduced because the user is not continually switching his or her gaze between opposite sides of the touch-sensitive display 118. In addition, the area of the touch-sensitive display that is used to display the gesture input area 204 and the keyboard area 202 is generally smaller than the area used for displaying a standard QWERTY keyboard. When the gesture input area or keyboard area is transparent, additional touch-sensitive display area is gained.

The methods described herein may have particular advantages for large touch-sensitive displays, such as in a tablet computer, for example, in which the keyboard area and the gesture input area are widely spaced. Because two handed keyboard entry is often necessary in such devices due to ergonomic constraints, the methods described herein increase the efficiency of character input with two hands.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    detecting a touch at a key in a keyboard area on a touch-sensitive display of an electronic device, the key being associated with multiple characters, and adding ones of the multiple characters to character strings;
    determining candidate character strings by identifying objects in reference data that have initial portions that match the character strings;
    displaying a single one of the candidate character strings on the touch-sensitive display, others of the candidate character strings being viewable in response to detection of a touch at another key in a keyboard area;
    receiving a gesture input in a gesture input area on the touch-sensitive display, a keyboard-related function associated with the gesture input being determined at a processor of the electronic device, no duplication of functionality being provided between the keyboard area and the gesture input area;
    in response to the gesture input, entering the single one of the candidate character strings in a display area of the touch-sensitive display;
    wherein the keyboard area is located adjacent a first side of the touch-sensitive display and the gesture input area is located adjacent a second side of the touch-sensitive display, the first side being opposite to the second side.

2. The method as claimed in claim 1, wherein a second gesture input is associated with a second keyboard-related function.

3. A method as claimed in claim 1, wherein the one of the candidate character strings is displayed in the keyboard area.

4. A non-transient computer readable medium comprising instructions executable on a processor of an electronic device for implementing the method of claim 1.

* * * * *